United States Patent
Bracewell et al.

(10) Patent No.: US 7,177,949 B2
(45) Date of Patent: *Feb. 13, 2007

(54) TEMPLATE ARCHITECTURE AND RENDERING ENGINE FOR WEB BROWSER ACCESS TO DATABASES

(75) Inventors: Shawn D. Bracewell, Duvall, WA (US); Troy Mayhan, Bothell, WA (US); Russell L. Simpson, Jr., Kirkland, WA (US); Puhazholi Vetrivel, Kirkland, WA (US); Ward Beattie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/256,744

(22) Filed: Oct. 24, 2005

(65) Prior Publication Data

US 2006/0041685 A1    Feb. 23, 2006

Related U.S. Application Data

(63) Continuation of application No. 09/774,965, filed on Jan. 31, 2001, now Pat. No. 7,013,351.

(60) Provisional application No. 60/237,259, filed on Oct. 2, 2000.

(51) Int. Cl.
G06F 15/16    (2006.01)

(52) U.S. Cl. .................. 709/246; 709/201; 709/202; 709/203; 709/206; 709/218; 709/219; 709/230; 709/231; 709/232; 709/238; 709/245

(58) Field of Classification Search ............... 709/201, 709/202, 203, 205, 206, 217, 218, 219, 230, 709/231, 232, 238, 245, 246
See application file for complete search history.

Primary Examiner—Nathan J. Flynn
Assistant Examiner—Ashok Patel
(74) Attorney, Agent, or Firm—Workman Nydegger

(57) ABSTRACT

Methods, systems, computer program products, and data structures for displaying data on a web browser interface where the data in its native format is not displayable on a web browser interface. A network server receives a request for content from a network device where the request includes a request for data that is not displayable on a web browser. The network server identifies a template, which will be used to transform non-displayable data into displayable content. The network server accesses non-displayable data that is stored on a data server and processes the accessed non-displayable data according to the identified template in order to transform it into displayable content. A template may include HTML code as well as customized tags. The customized tags are consumed by a rendering engine, which executes certain functions to modify the data, making it displayable content. Once transformed, displayable content is sent to the network device.

20 Claims, 5 Drawing Sheets

```
401 ——— #ifdef Default Browser Type                    Source Code 400
402 ———   <HTML>
403 ———   <HEAD>
404 ———   <TITLE>Sample Default Template</TITLE>
405 ———   <BODY>
406 ———   <A HREF="{xst:get-value type='href' for='DAV:href'/}">Click here</A>
407 ———   </BODY>
408 ———   </HTML>
409 ——— #else
410 ———   <HTML>
411 ———   <HEAD>
412 ———   <TITLE>Sample Other Template</TITLE>
413 ———   <Body>
414 ———   <A HREF="{xst:get-value type='href' for='DAV:href'/}">Click here</A>
415 ———   </BODY>
416 ———   </HTML>
417 ——— #endif
```

FIG. 4

DATA STRUCTURE
500

| DATA DICTIONARY 501 |
|---|
| TEMPLATE CONSTANTS 502 |
| FUNCTIONS 503 |
| TOKEN INFORMATION TABLE 504 |
| HTML DATA 505 |

FIG. 5

TEMPLATE ARCHITECTURE AND RENDERING ENGINE FOR WEB BROWSER ACCESS TO DATABASES

CROSS-REFERENCE TO RELATED APPLICATIONS

This application is a continuation of application Ser. No. 09/774,965, filed Jan. 31, 2001, and entitled "TEMPLATE ARCHITECTURE AND RENDERING ENGINE FOR WEB BROWSER ACCESS TO DATABASES", now U.S. Pat. No. 7,013,351, which claims priority from U.S. Provisional Application Ser. No. 60/237,259, filed Oct. 2, 2000, and entitled "TEMPLATE ARCHITECTURE AND RENDERING ENGINE FOR WEB BROWSER BASED ACCESS TO EXCHANGE EMAIL", both of which are incorporated here by reference. This application claims the benefit and priority of both of the foregoing applications.

BACKGROUND OF THE INVENTION

1. The Field of the Invention

The present invention relates to displaying data of varied formats using a web browser. More specifically, the present invention relates to displaying data on a Web browser, the data not being natively compatible with display on the web browser, and where the display is facilitated using a template.

2. Background and Related Art

The popularity of the Internet has profoundly improved the way people communicate by allowing users quick and easy access to information. By accessing the World Wide Web and electronic mail through computers and other devices, people now stay in touch with each other around the globe, and can access information on a virtually limitless variety of subjects.

With the ever-increasing use of the World Wide Web, there is a need to securely and efficiently display data stored in a variety of differing formats using a web interface such as a web browser. This includes simultaneously displaying data where the data is stored in formats that are not natively compatible with display using a web browser.

Current methods for displaying non-web data in a web format employ generalized data binding techniques. While such products are capable of displaying a variety of data formats, their generality leads to inefficiency when accessing certain types of data, which places an unneeded strain on the resources of such systems that use general-purpose data collection products. Additionally, adding support to display data in different languages requires extensive recoding, which is an inefficient use of programming resources. Also, due to the operation of such products, the object modules associated with these methods are generally accessible during operation, which decreases the security of systems that employ such methods.

Accordingly, what are desired are systems, methods, computer program products, and data structures that facilitate more secure Web access to data that is not natively compatible with a Web browser, and where changes to the layout (such as language changes or layout changes that depend on the type of Web browser) on the Web browser are more easily realized without extensive recoding.

SUMMARY OF THE INVENTION

The present invention relates to systems, methods, computer program products, and data structures for efficiently rendering data that is not natively compatible for viewing on web browsers. The rendering may be performed across a variety of different web browsers and languages with minimum recoding, and with reduced security risk.

The present invention uses "templates." By using templates, it is possible to view a particular set of data on a Web browser where normally the set of data would not be viewable. A template is used to define a web page including how data not normally viewable on a Web browser should be processed to make it viewable. A template may include references to data stored in a database and functions that process the referenced data to produce displayable data.

Templates are created by including custom tags, which are references to other subroutines, and processor directives in HTML documents. Processor directives may instruct the processor to perform certain operations when generating a template, such as generating a template for different types of Web browsers. After a template is generated it may be associated with any number of language support files. When additional language support files are added, the template may be associated with these added files with out having to re-generate the template. In a Microsoft® Windows® environment this may be as simple as copying a new file onto an associated computer system.

Using templates makes accessing data more efficient because templates may be custom generated for use with specific data. Since adding functionality for a new language is often as simply as copying a new file onto a computer system, templates also provide an efficient way to display data in a variety of languages. Furthermore, since templates are compiled, they are essentially unreadable, which makes it difficult for unauthorized users to determine what data the template is accessing and modify the data in any way. Additionally, the object code associated with templates is stored in a location different from associated HTML code. Thus, even if an unauthorized person were to gain access to the HTML code, all the person would see is the customized tag that is included in the HTML document. There would be no way for the unauthorized person to modify any code associated with the functionality of the customized tag.

Templates may typically be used in a network environment such as a LAN, WAN or on the Internet. These environments include multiple interconnected computer systems, which may typically need to access stored data. In an Internet environment, it may also be the case that a number of computer systems are employing Web browsers to access data stored on network servers or data servers, across the World Wide Web. A user may have access to a computer system including a Web browser, but the computer system does not include programs needed to display data from proprietary e-mail or other databases and this data is not natively displayable using a Web browser.

In accordance with the present invention, a user may make a request to a network server requesting such proprietary data. Included in the request is information that allows the network server to identify what browser type and language the requested content should be returned in. For example, if the request is an HTTP request, the Accept-Language HTTP header may be used to determine the language, and the User-Agent HTTP header may be used to determine the browser type.

When the network server receives the request, it determines which template is associated with displaying the requested content for the Web browser type. A template may include displayable content such as HTML code, which may display fixed items such as the "TO" or "FROM" fields when viewing e-mail data. The template may also include non-displayable content, such as functions that retrieve and process other non-displayable data from a data server.

After the correct template is identified, the network server may access non-displayable data from the data server. Such non-displayable data may be an e-mail message that is formatted for use using a specific e-mail client that is not compatible with a Web browser or a word processing document which would normally be viewed using a word processing program such as MICROSOFT® Word.

Once the data is retrieved, the network server constructs the requested displayable content. This may include processing the displayable content as specified in the identified template. The processing may include using the non-displayable data as input for one or more functions so that it may be converted into a format that is viewable using a Web browser. This may also involve intermixing already displayable portions of the template with the processed, formerly non-displayable, content to create the requested displayable content. Once the requested content is in a format for Web browser viewing, the network server sends the displayable content to the Web browser.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is an example of HTML code including customized tags that illustrates how a template may be constructed; and FIG. 5 is an example of a data structure that illustrates a representation of a data layout for a template.

DETAILED DESCRIPTION OF THE INVENTION

The present invention extends to methods, systems, computer program products, and data structures data for rendering content in order to make it displayable on a Web browser. Templates are used to access and format data that would otherwise not be displayable on a Web browser. The template architecture reduces the coding time needed to create templates for use with different types of Web browsers and for use with a variety of different languages. Templates are compiled from native HTML code as well as customized tags, these customized tags are processed to do the actually data gathering.

When a network server receives a request for data, the network server determines what template to use based on the browser type, language, action requested, and object state. At run time, a rendering engine processes the customized tags to access and format data that will be sent to a Web browser.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
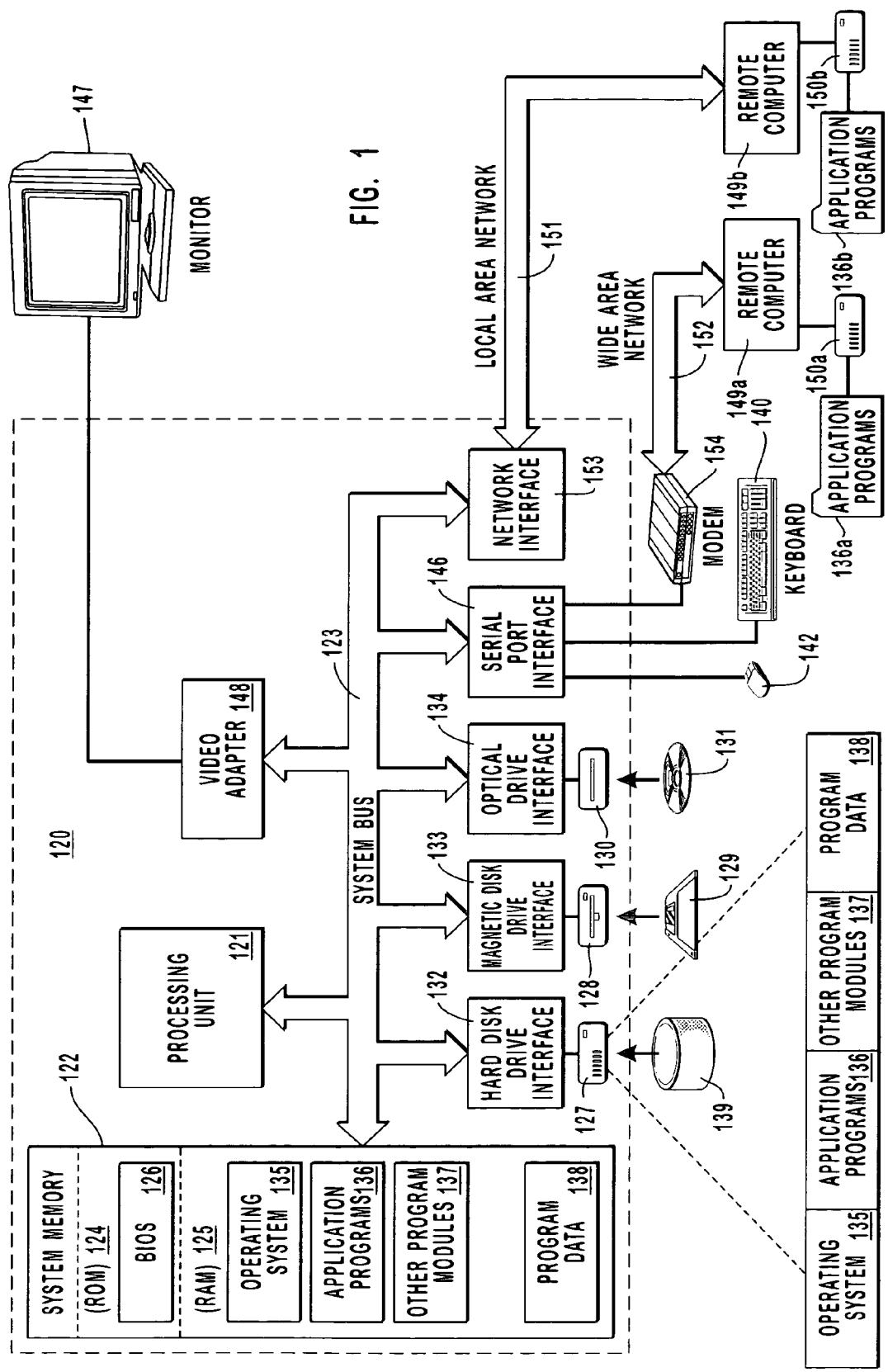
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

In this description and in the following claims, the term "computer" should be interpreted broadly to encompass a general purpose or special purpose computer or any other computing device including, but not limited to, various computer hardware components, such as those illustrated in FIG. 1. A "computer system" includes a group of one or more computers that interact cooperatively to perform one or more functions. A "network system" includes a plurality of interconnected computer systems, as well as other devices that may be connected to computer systems. A "client system" is a computer system that uses the services of another computer system. In contrast, a "server system" is a computer system that provides services to another computer system.

Note that a computer system may use the services of another computer system and yet still provide services to other computer systems. Thus, a client system in one context may also be a server system in another context. Similarly, a server system in one context may also be a client system in another context.

Reference is also be made to a "network server" or "data server." These types of servers fit inside the "client system"/"server system" dichotomy as described above and may provide services to other computers and/or use services of other computers simultaneously.

In this description and in the following claims the term HyperText Markup Language, or HTML refers to the authoring language used to create documents on the World Wide Web. HTML defines the structure and layout of a Web document by using a variety of tags and attributes. HTML is typically used to create documents that will be displayed on devices, such as a computer or computer system, using a web browser.

The term Uniform Resource Locator, or URL, refers to the global address of documents and other resources on the World Wide Web.

The term HyperText Transfer Protocol, or HTTP, refers to the underlying protocol used by the World Wide Web. HTTP defines how messages are formatted and transmitted, and what actions Web servers and browsers should take in response to various commands. For example, when you enter a URL in your browser, this actually sends an HTTP command "get" to the Web server directing it to return the requested Web page.

The term "displayable content" refers to content, which when received and output by a web browser such as Microsoft® Internet Explorer or Netscape Navigator®, has meaning to a human being. Displayable content primarily includes, but is not limited to, visual text or images or audio sounds, which when output have meaning to a human being. Displayable content may take the form of an HTML document.

In contrast, the term "non-displayable data" refers to data, which if sent to a web browser, such as Microsoft® Internet Explorer or Netscape Navigator®, in its native format would not be output in a manner that has meaning to a human being.

The term Dynamic Link Library, or DLL, refers to a library of executable functions or data that can be used by a Microsoft® Windows® application. Typically, a DLL provides one or more particular functions and a program accesses the functions by creating either a static or dynamic link to the DLL. A static link remains constant during program execution while a dynamic link is created by the program as needed. DLLs can also contain just data. A DLL can be used by several applications at the same time. Some DLLs are provided with the Microsoft® Windows® operating system and available for any Windows application. Other DLLs are written for a particular application and are loaded with the application.

While FIG. 1 and the corresponding discussion above provide a general description of a suitable environment in which the invention may be implemented, it will be appreciated that the features of the present invention may be practiced in association with a variety of configurations. Therefore, the components illustrated in FIG. 1 provide only one exemplary environment for practicing the present invention. It should be understood that the present invention, as described in connection with FIG. 2, might also be practiced in a configuration that additionally includes one or more of the components as shown in FIG. 1.

Figure 2:
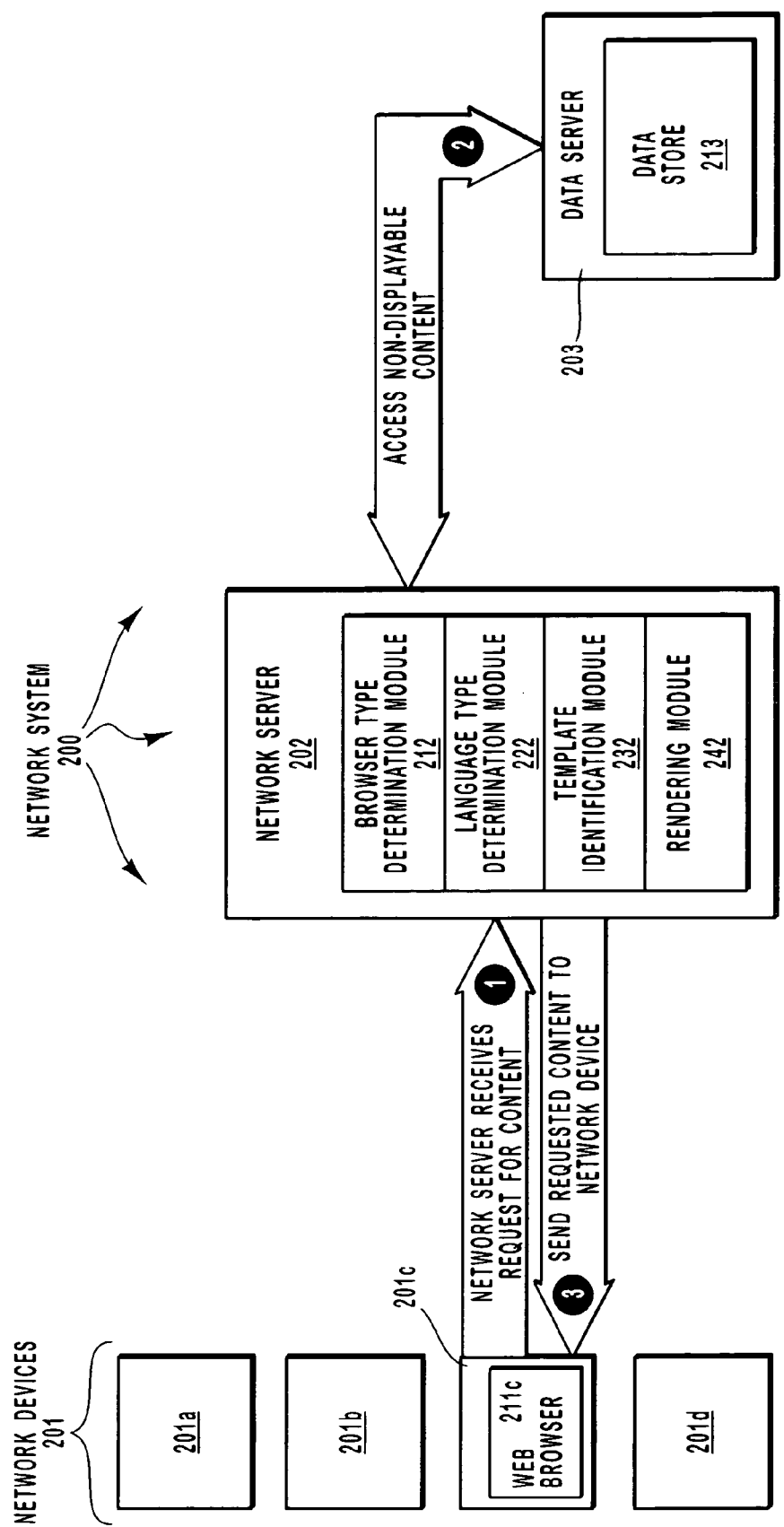
FIG. 2 illustrates some of the functional components present in a network system where data from a data server may be rendered to a network device.

FIG. 2 illustrates a network system 200 suitable for implementing the principles of the present invention. The network system 200 includes network devices 201, network server 202 and data server 203. Network devices 201 includes one or more network devices, including network device 201c. Network server 202 includes browser type determination module 212, language type determination module 222, template identification module 232 and rendering module 242. Data server 203 includes data store 213. Although not required, each of the network devices 201, network server 202 and data server 203 may be structured as described above for computer 120. The components of the network system 200 mentioned above work together to implement the principles of the present invention.

Figure 3:
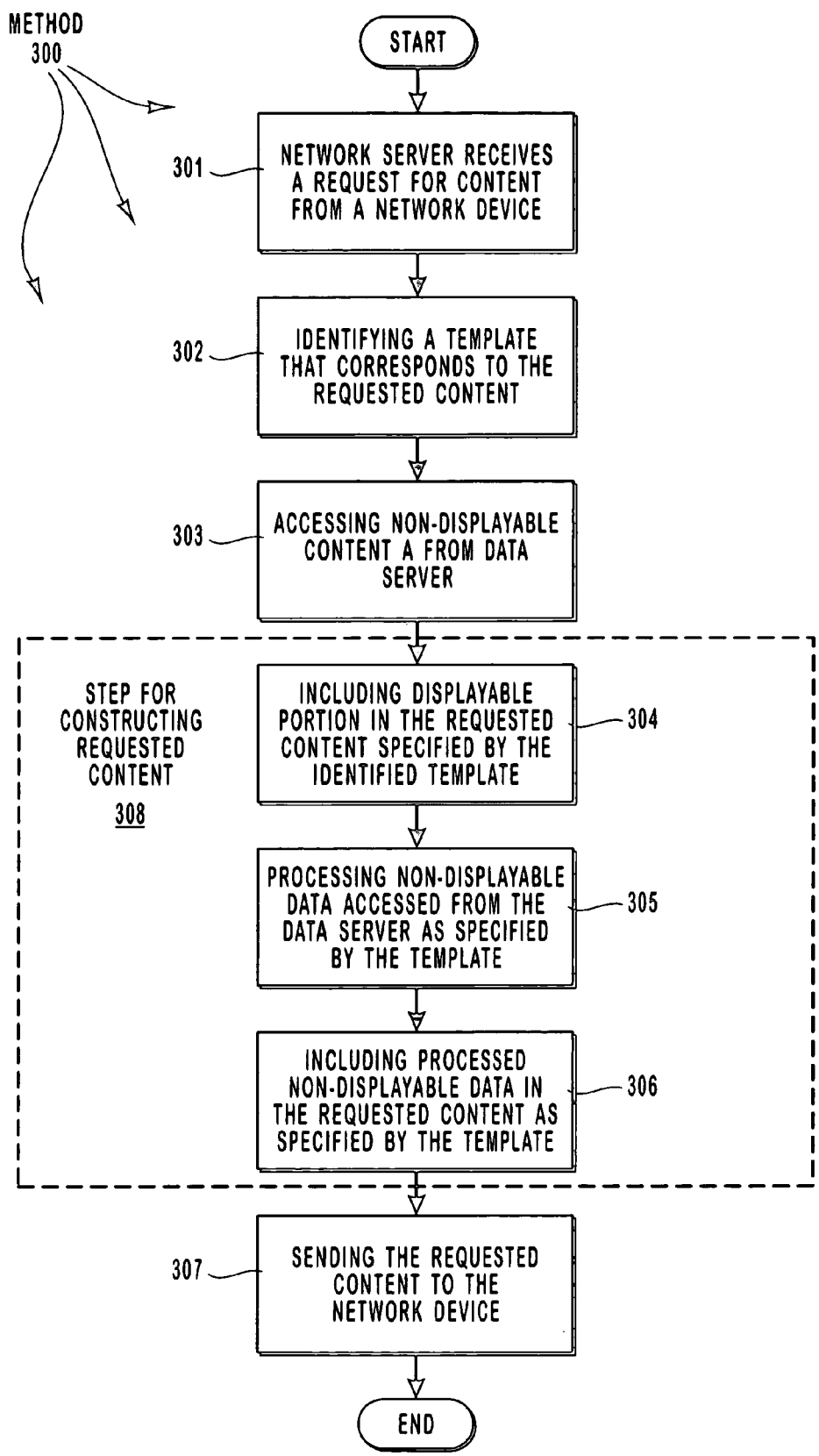
FIG. 3 is a flow diagram illustrating a method whereby data from a data server is rendered on a network device.

FIG. 3 illustrates a method 300 for rendering data from the data server 203 to create displayable content in accordance with the present invention. The method of FIG. 3 will be described in the context of the network system illustrated in FIG. 2. Thus, elements of both FIGS. 2 and 3 will be referred to frequently in describing the operation of the present invention. The functionality of each of the components of FIG. 2 will become clear from the following description relating to both FIG. 2 and FIG. 3.

In operation, network device 201c generates a request for displayable content. This request for displayable content may be, for example, an HTTP request making a request for an HTML document. The web browser 211c (e.g., one of the application programs 136 of FIG. 1) associated with the network device 201c may generate the HTTP request which may be passed to the operating system (e.g., operating system 135 of FIG. 1) to thereby transmit the HTTP request to the network server 202. The network server 202 then receives the request for the displayable content (act 301). This is illustrated by arrow 1 in FIG. 2.

As an application example, suppose the user of the network device 201c is traveling with the network device 201c, but desires to view her electronic mail in-box to keep up-to-date. The user would then use the user interface of the web browser 211c to indicate such a desire. In response, the web browser 211c would generate an HTTP request for the in-box content and use the operating system to transmit the HTTP request to the network server 202.

Note that network device 201c, network server 202 and data server 203 are illustrated in FIG. 2 and described in the application example as being physically separate computer systems. However, network device 201c, network server 202 and data server 203 may also be partially or fully integrated with each other. For instance, if network device 201c and network server 202 where integrated, requests for displayable content would not be transmitted using network messaging. The web browser 211c of the network device 201c may pass the request to the network server 202 as a call through an Application Program Interface (API).

Upon receiving the request for the displayable content (act 301), network server 202 identifies a template that corresponds to the requested content (act 302). In FIG. 2, network server 202 includes browser type determination module 212, language type determination module 222, and template identification module 232. Browser type determination module 212 determines the type of browser that the requested content will be sent to. The browser type may be explicitly identified in the request for content. However, the browser type may also be determined by other characteristics included in the request, such as the type of operating system that sent the request. Likewise, language type determination module 222, determines the language the requested displayable content will be sent in. This may also be explicitly identified in the request or may be determined from other characteristics included in the request.

Template identification module 232 uses the determinations made by browser type determination module 212 and language type determination module 222 in identifying a template that corresponds to the requested displayable content.

For example, in the practical example, a user transmits an HTTP request for her in-box to the network server. The browser 211c may automatically include an identifier identifying the version and type of the web browser as well as the preferred language of the user. The browser type determination module 212 and the language type determination module 222 may extract the express web browser type and language indications in the request and pass the results to the template identification module 232. The template identification module 232 then identifies the appropriate in-box template based on the web browser type and language.

Note that the various modules 212, 222, 232 and 242 are illustrated functionally as being separate modules. However, any two or more of these modules may be combined into a single integrated module. In addition, any single module may be broken down into multiple modules that perform more specific tasks.

Template identification module 232 may also use other data included in the request for content from network device 201c in making template identification or may use other already known data. Such data may include the bandwidth available to send the requested content, operating systems being used by computers attached to network system 200, or transient network conditions on network system 200. Template identification module 232 may also use information about the item being bound to help determine the exact template to fetch. For example, an email you've received vs.

an email you are composing—both email messages—result in different templates for doing their rendering.

Since such data may change over time, one feature of the template architecture is that templates may initially be coded to display data to different types of web browsers, in different languages or coded to account for other changes that may occur. That is, only one template need be created for a view and this template will be properly rendered on a variety of web browsers and languages. As a result, there is no need for extensive recoding to add functionality for a new browser type or language. For instance, referring to the application example of requesting an electronic mail in-box, an identified template may process requested displayable content in one way when the user of network device 201c requests access over a dial-up line, such as wide area network 152. However, the same template may process requested displayable content in different way when the user requests access over a permanent network connection, such as local area network 151.

FIG. 4 shows example source code 400 in which custom tags are included in an HTML document. Such source code, when compiled, results in a template data structure that might be identified in act 302. Although the network server 202 does not read the source code of the template at run time (the compiled template data structure is instead used), the source code may be used to explain the features and functionality of the template.

At line 401, the browser type is checked to determine if the browser the requested content will be returned to is the default browser type. If the browser is the default type, then at the time data is rendered, lines 402 through 408 will be processed. If the browser is not the default type, then at the time data is rendered, lines 410 through 416 will be processed.

Lines 402–405 and 407–408 are simple HTML code, when these lines are processed they will not be changed. Line 406 includes a customized tag. The particular tag included at line 406 is referred to as an xst-tag of which there are several types. The example given at line 406 is a call to get data, or "get-value," from "DAV:href," which may be a portion of the data stored in data store 213. The type attribute is used to specify how the data should be encoded at the time the template is processed. In this case "href" means that the data should be URL-encoded when the template is processed. The purpose of the customized tags is to provide instructions to the network server 202 identifying the non-displayable data, and the processing that is to be performed on the non-displayable data. The customized tags may be of any format so long as the network server 202 is able to interpret the customized tags as represented in the template. The processing of the non-displayable data includes processes to present the non-displayable data so that the data may be displayed on a Web browser.

In FIG. 4, customized tags for the default Web browser and other types of browsers are similar. However, this is not required. It may be that different browser types have different display capabilities. This may require accessing differing sets of data from data store 213 in order to properly display the data. It may also be that certain functions need to be performed on the data before display on particular types of browsers. Also, different customized tags may be used depending on the language the requested content will be displayed in, other characteristics of the request, or network conditions on network system 200 at the time the request is made.

While FIG. 4 depicts a template including two customized tags, any number of tags may actually be included. For instance, referring back the example of accessing an electronic mail in-box, when retrieving the contents of the in-box a template may include customized tags for the "To," "From," "Subject," "Date," and "Time" fields of each electronic mail message included in the in-box.

After a template is coded, it is compiled into a form that may be represented by a data structure. FIG. 5 shows an exemplary data structure used to represent a template. Data structure 500 includes data dictionary 501, template constants 502, functions 503, token information table 504, and HTML data 505.

Data dictionary 501 identifies those data items that were represented in the template source code 400 and that are stored in data store 213. Template constants 502 includes constant data that will be used when rendering the template. For instance, template constants 502 may include references to things such as the words "To" and "From" if the template were being used to create a view to an electronic mailbox. Template constants 502 may also be used to hold formats for things such as time and date. Functions 503 references functions that are built into rendering module 242. Such functions may be used to manipulate data before it is sent as content to network device 201c. Token information table 504 correlates functions, references to data, and constants to the relative position in the HTML body. HTML data 505 is what is left out of a template after the template renderer removes all the custom tags. In FIG. 4, HTML data 505 would refer to lines 402–405, 407, 408, 410–413, 415 and 416.

After a template is identified in act 302, network server 202 accesses data from data server 203, as illustrated by arrow 2 in FIG. 2 (act 303). One computer system accessing data from another computer system may be performed by any number of methods well known in the art. As illustrated in FIG. 2, network server 202 and data server 203 are two physically separate computer systems. However, network server 202 and data server 203 may also be integrated so that the request for content need not be transmitted using network messaging. In this instance, modules on network server 202, such as template identification module 232, rendering module 242 or other modules, may pass the request to the data server 203 as a call through an Application Program Interface (API).

After data is accessed from data server 203, the network server 202 performs a step for constructing the requested displayable content (step 308). In one embodiment, step 308 may include an act of including displayable portions of an identified template in the requested content (act 304). Displayable portions may include HTML directives that are included as part of a template or other displayable content.

Step 508 may also include an act of the network server processing non-displayable data accessed from a data server (act 305). Act 305 may include processing custom tags that are included in the HTML text, as illustrated in FIG. 4. In one example, rendering module 242 parses a compiled template to detect customized tags, but does not modify any native HTML. Rendering module 242 generates a preliminary view (e.g., a web page) of the data in data store 213 that was accessed in act 303. Such data may be the contents of the user of network device 201c's electronic mail in-box. An advantage of this format is that since the data is processed at run time, that is, at time the template is processed, and templates are in their compiled format when processed, there is reduced risk of unauthorized access to data. To directly access the data in data store 213, a user would have to decompile a template.

Another design feature, which may be included in rendering module 242, allows reference to localized versions of things such as strings and date/time formats and then this data is rendered at run time based on the language that will be used to output the requested content. Localized data for a language is stored in files that are external to the code of the rendering engine and templates. In a Microsoft® Windows environment, these may take the form of resource DLL files. To add support for a new language, an administrator need only install a resource DLL for an appropriate language. No modification to the rendering engine code or to any templates is required. Not only does this provide an easy way to quickly add support for additionally languages, but the rendering process is more efficient because it functions the same using any language.

This localization benefit may be obtained by including a generic representation of template constants in the template source code. For example, instead of directing the rendering of words such as "TO" or "FROM", a customized tag may direct the rendering of the localized versions of these fields. For example, the rendering module 242 determines from the language type determination module 222, the precise language used (e.g., English). The network server 202 then identifies the DLL file corresponding to this language and extract the appropriate words to convey the intended meaning (e.g., "TO" and "FROM"). If the localized language were French or Mandarin, for example, different DLL files would be access to retrieve the relevant equivalent of "TO" and "FROM".

Step 308 may also include an act of the network server then including the processed non-displayable data, which is now displayable content as a result of the processing, in the requested content (act 306). After this act, both the displayable portion and the processed non-displayable data are included in a finalized view (e.g., a web page) to the data in data store 213 that was accessed in act 303

Network server 202 then sends the requested content to a network device (act 307). In FIG. 2 the requested content is illustrated as being sent to network device 201*c* by arrow 3. However, the requested content may also be sent to another network device attached to network 200, or to other network devices on other networks attached to network system 200, such as the Internet.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computing system for use in a network that includes one or more network devices that have Web browsers implemented thereon, the network devices being network connectable to a network server, the network also including a data server that is in communication with the network server, wherein the network server sends displayable content to the network devices, and wherein the one or more network devices may request data that is stored in the data server even though the data server itself is not configured to present the data as displayable content, the computing system further comprising:

one or more computer-readable media having computer-executable instructions for implementing a method for rendering data received from the data server to create displayable content, wherein the method comprises:

an act of the network server receiving a request for displayable content from a Web browser at a network device;

an act of identifying a template for the displayable content based on bandwidth available to send the displayable content to the network device, the template including one or more displayable portions that are natively compatible for viewing with the Web browser, one or more generic representations of template constants that are generic across a plurality of languages, one or more tokens representing non-displayable data that is stored on the data server and is not natively compatible for viewing with the Web browser, one or more functions for converting the non-displayable data into a format that is natively compatible for viewing with the Web browser, and one or more functions for providing the template constant in an appropriate language for the user of the Web browser;

an act of retrieving the non-displayable data from the data server, the data server storing the non-displayable data in any of a plurality of non-displayable formats;

an act of the network server using the identified template to construct the displayable content by performing the following acts:

an act of including displayable portions in the displayable content as specified in the identified template;

an act of converting the non-displayable data retrieved from the data server that stores the non-displayable data in any of the plurality of non-Web formats, by using the one or more functions included within the identified template, into a format that is natively compatible for viewing with the Web browser;

an act of including the template constant in the appropriate language; and an act of including the converted data in the displayable content as specified in the identified template; and an act of sending the displayable content to the network device.

2. The computing system as recited in claim 1, wherein the displayable content comprises a HyperText Markup Language (HTML) document.

3. The computing system as recited in claim 1, wherein the displayable portions comprise HTML tags.

4. The computing system as recited in claim 1, wherein the request for displayable content comprises information allowing the network server to identify the web browser type that will be used on the network device to display the displayable content.

5. The computing system as recited in claim 1, wherein the request for displayable content comprises language information identifying the appropriate language to be used in the displayable content, and wherein the method further comprises the following:

an act of identifying the appropriate language based on the language information.

6. The computing system as recited in claim 5, wherein the language information comprises an express language indication, and wherein the method further comprises the following:

an act of identifying the appropriate language based on the express language indication.

7. The computing system as recited in claim 1, wherein the network server and the data server are physically integrated.

8. The computing system as recited in claim 1, wherein the network server and the data server are physically separate.

9. A computing system as recited in claim 1, wherein the plurality of languages includes English, Mandarin, and French.

10. A computing system in a network that includes one or more network devices that have Web browsers implemented thereon, the network devices being network connectable to a network server, the network also including a data server that is in communication with the network server, wherein the network server sends displayable content to the network devices, and wherein the one or more network devices may request data that is stored in the data server even though the data server itself is not configured to present the data as displayable content, the computing system further comprising:
  one or more computer-readable media having computer-executable instructions for implementing a method for rendering data from the data server to create displayable content, wherein the method comprises:
    an act of the network server receiving a request for displayable content from a network device;
    an act of identifying a template for the displayable content based on bandwidth available to send the displayable content to the network device, the template including one or more displayable portions that are natively compatible for viewing with the Web browser, one or more generic representations of template constants that are generic across a plurality of languages, one or more tokens representing non-displayable data that is stored on the data server and is not natively compatible for viewing with the Web browser, one or more functions for converting the non-displayable data into a format that is natively compatible fore viewing with the Web browser, and one or more functions for providing the template constant in an appropriate language for the user of the Web browser;
    an act of retrieving the non-displayable data from the data server, the data server storing the non-displayable data in any of a plurality of non-displayable formats;
    a step for constructing the displayable content so as to represent both the displayable portions and the non-Web data stored in any of the plurality of non-Web formats at the data server by using the one or more functions included within the identified template to convert the non-Web data into a format that is natively compatible for viewing with the Web browser; and
    an act of sending the displayable content to the network device.

11. The computing system as recited in claim 10, wherein the request for displayable content comprises language information that identifies the language to be used in the displayable content.

12. The computing system as recited in claim 10, wherein the displayable content comprises a HyperText Markup Language (HTML) document.

13. The computing system as recited in claim 10, wherein the displayable portions comprise HTML tags.

14. The computing system as recited in claim 10, wherein the request for displayable content comprises information allowing the network server to identify the web browser type that will be used on the network device to display the displayable content.

15. The computing system as recited in claim 10, wherein the request for displayable content comprises language information identifying the appropriate language to be used in the displayable content, wherein the method further comprises the following:
  an act of identifying the appropriate language based on the language information.

16. The computing system as recited in claim 15, wherein the language information comprises an express language indication, wherein the method further comprises the following:
  an act of identifying the appropriate language based on the express language indication.

17. The computing system as recited in claim 10, wherein the network server and the data server are physically integrated.

18. The computing system as recited in claim 10, wherein the network server and the data server are physically separate.

19. The computing system as recited in claim 10, wherein the act of the network server receiving a request for displayable content comprises the following:
  an act of the network server receiving a request for displayable content via network messaging.

20. The computing system as recited in claim 10, wherein the act of the network server receiving a request for displayable content comprises the following:
  an act of the network server receiving a request for displayable content via receiving a call to an Application Program Interface (API).

* * * * *